(No Model.)

H. NEWLIN.
SEPARATING AND DRYING APPARATUS.

No. 267,919. Patented Nov. 21, 1882.

WITNESSES:
Donn Twitchell.
C. Sedgwick

INVENTOR:
H. Newlin
BY Munn & Co
ATTORNEYS.

UNITED STATES PATENT OFFICE.

HOWARD NEWLIN, OF BROOKLYN, NEW YORK.

SEPARATING AND DRYING APPARATUS.

SPECIFICATION forming part of Letters Patent No. 267,919, dated November 21, 1882.

Application filed August 5, 1882. (No model.)

*To all whom it may concern:*

Be it known that I, HOWARD NEWLIN, of Brooklyn, in the county of Kings and State of New York, have invented a new and Improved Separating and Drying Apparatus, of which the following is a full, clear, and exact description.

My invention relates to apparatus for screening or separating materials—such as street-sweepings, coal, &c.—and also for drying and cooling grain and other materials.

The invention consists in a novel construction of the screen or drier, the same being formed with a series of inclines and shoulders extending transversely for insuring the forward movement of the material in the frame or chute, as hereinafter described and claimed.

Reference is to be had to the accompanying drawings, forming a part of this specification, in which similar letters of reference indicate corresponding parts in all the figures.

Figure 1:
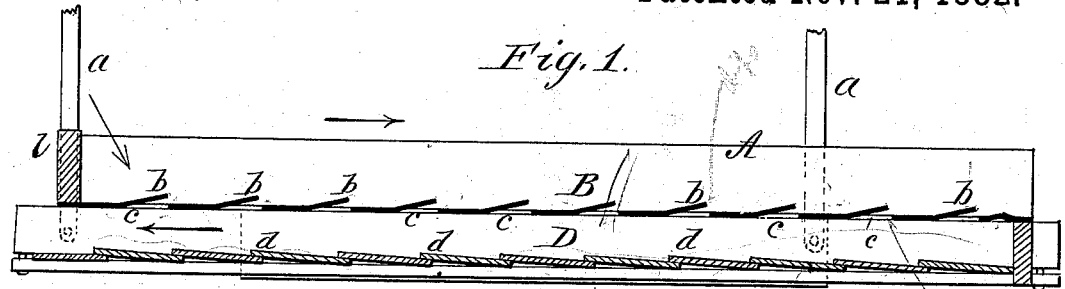
Figure 2:
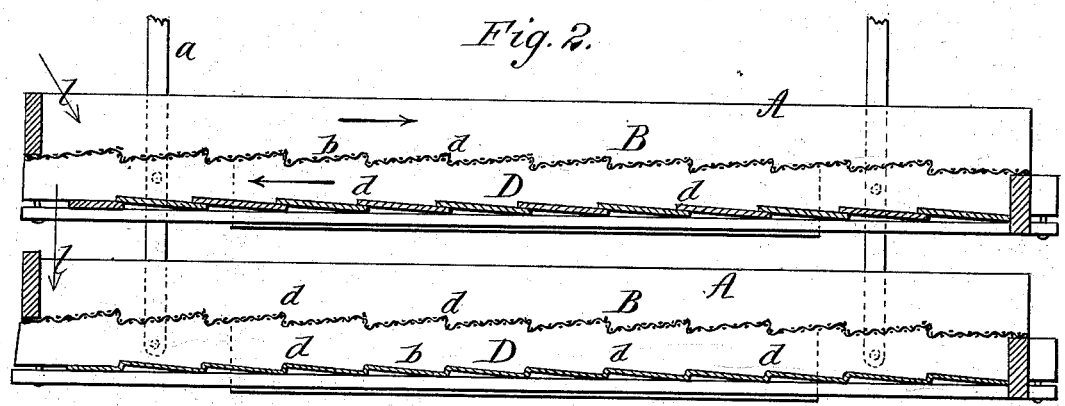
Figure 3:
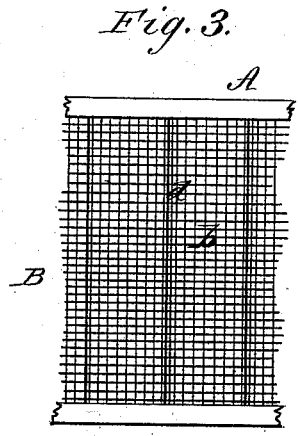

Figure 1 is a longitudinal section of my improved apparatus as constructed for use as a separator. Fig. 2 is a similar view of the apparatus as arranged for drying grain and other materials. Fig. 3 is a detail plan view.

The frame A is of oblong form, and may be of any suitable length and width, and it is to be suspended for horizontal vibration by means of straps or rods $a$, or it may be supported upon sliding ways or rollers.

B is the screen, fitted in the frame, made of sheet metal, which is slit transversely and the portion cut out raised to form the inclined lips $b$ and openings $c$, extending entirely across the screen.

Beneath the screen B is the second bottom, D, which may be constructed, as shown in Fig. 1, of a series of imbricated plates; or this bottom D may be constructed, as shown in Fig. 2, of a single plate of metal bent to form the shoulders $d$, that are formed by the ends of the plates in Fig. 1. In either case, and also in the case of the screen B, the result of this construction is that the bottoms have a series of inclines terminating with square shoulders, the inclines on the separator or drier bottom D being in reverse of those upon the screen B. The object of the openings $c$ (shown in Fig. 1) is to provide for the use of the apparatus as a screen or separator, the openings $c$ allowing the escape of the finer materials upon the separator or drier bottom D, while the coarser materials escape at the end of the separator from the end of the screen B.

When used as a separator or screen the material is fed upon the screen at the end marked $l$, and is fed forward by the action of the shoulders of the inclines $b$ and the reciprocation of the screen-frame. The finer materials pass through the openings $c$, and in the same manner are carried upon the bottom D in a reverse direction on account of the reversed shoulders on screen and bottom.

When used as a cooler or drier the apparatus may be constructed, as shown in Fig. 2, with a series of frames, A, placed one above the other, so that the material will be carried backward and forward upon the screen B and bottom D, and be thus spread over a large extent of surface.

The screen B may be made of sheet metal or wire-cloth bent to form the incline and shoulders, as shown in Figs. 2 and 3 of drawings.

Having thus described my invention, I claim as new and desire to secure by Letters Patent—

In a separator and drier, frame A, the top screen, B, having the openings $c$ and the lips $b$ on the upper side, said lips and openings extending transversely across the screen, in combination with a bottom, D, consisting of plates lapped to form shoulders in a reverse direction from those of the screen, as described.

HOWARD NEWLIN.

Witnesses:
C. SEDGWICK,
E. M. CLARK.